3,043,704
Patented July 10, 1962

3,043,704
COATING COMPOSITIONS HAVING REDUCED ODOR ON DRYING
Oliver J. Grummitt, Cleveland, Ohio, assignor to The Sherwin-Williams Company, Cleveland, Ohio, a corporation of Ohio
No Drawing. Filed Jan. 24, 1956, Ser. No. 561,141
5 Claims. (Cl. 106—252)

This invention relates, as indicated, to improved coating compositions in which the problem of odor in connection with drying has been specifically alleviated. The subject matter of this invention is related to the subject matter of co-pending application Ser. No. 517,084, filed June 21, 1955, now abandoned.

The odors of non-aqueous coating compositions, pigmented or not, containing as essential ingredients drying oils or drying oil modified resins are familiar to everyone. The odor of the paint in the can, during application and during the first few hours that the film is on the surface is attributable to the volatile organic solvent. Usually these solvents are of the hydrocarbon type, e.g., mineral spirits, naphtha, xylol and the like. In recent years so-called odorless mineral spirits have been developed and these have given a very considerable improvement in odor during application and early drying.

However, the odor generated in the drying film, which is noticeable soon after application and which may last for several days, is not improved by the substitution of odorless mineral spirits for the conventional hydrocarbon solvents. "Drying paint" odor is presumably caused by oxidative polymerization in the film with the formation and escape of volatile organic compounds such as acids, aldehydes, etc.

It is a principal object of this invention, therefore, to provide non-aqueous coating compositions having reduced "drying paint" odor.

Another object of this invention is to provide a method for improving the odor on drying of coating compositions containing binders reactive with atmospheric oxygen.

Other objects of this invention will appear as the description proceeds.

It has been found that coating compositions formulated to contain a minor amount of certain sulphonic acid salts characterized by an alpha carbon atom substituent reduce odor from oxidative polymerization sources upon drying. Unlike the numerous additives already available, the substances of this invention are substantially odorless per se. They are not, therefore, substances of the perfume or deodorant or masking type. Control of odor is believed to be obtained in the present compositions by in situ chemical reaction in contradistinction between other methods of odor control in such compositions.

Broadly stated, therefore, this invention contemplates a coating composition which dries at least in part by oxidation containing from about 0.001% to about 5% by weight of an ammonium salt of a sulphonic acid having the following general formula:

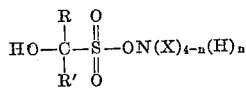

wherein R is selected from the group consisting of aliphatic radicles of at least 10 carbon atoms, cycloaliphatic radicles of at least 6 carbon atoms, and aromatic radicles; R' is selected from the group consisting of hydrogen and methyl, X is an organic radicle, and n is a number from 1 to 4. One convenient method of producing the odor controlling ingredients of the compositions of this invention is by the addition of an excess of ammonium bisulphite or an alkyl ammonium bisulphite to a substantially non-odorous aldehyde or ketone.

The structure of the alpha substituted sulphonates useful in accordance with this invention may be represented by the following formulas using the ammonium salt as a typical example.

(I) 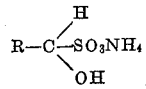

(II) 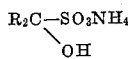

Where substituted ammonium bisulphite addition compounds of aldehydes and ketones are employed, in which one or more hydrogen atoms of the ammonium group is replaced by an equivalent number of hydrocarbon groups, the structural formulas may be represented as follows:

(III) 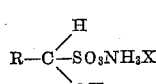

(IV) 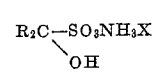

(V) 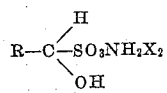

(VI) 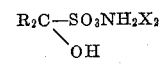

In the above formulas, X is an organic radicle selected from the group consisting of alkyl, cycloalkyl, arylalkyl and aryl groups. The X groups may be the same or different and the total possible number of such groups in the ammonium group of the bisulphite addition compound is 4.

The difference between these compounds and the metal bisulphite addition compounds of application Ser. No. 517,084 is that the replacement of the metal atom by ammonium or substituted ammonium groups enhances the solubility and compatibility of these compounds with non-aqueous paint systems containing mineral spirits, drying oils, drying oil modified alkyds or other common drying oil and semi-drying oil binder components, etc. Greater compatibility and solubility of these materials as addition agents increases their odor reducing effect.

Compounds having the formulas corresponding to I–VI and the obvious variations thereof are conveniently produced by the addition of ammonium bisulphite or substituted ammonium bisulphites to an aldehyde or a ketone of the non-odorous type.

The structure of such addition compounds is usually considered to be one in which the hydrogen atom of the bisulphite has become attached to the carbonyl oxygen, and the balance of the bisulphite radicle is attached to carbon. The bond between the carbon and the ammonium sulphite group is believed to be a carbon-sulphur bond, giving the structure corresponding to the ammonium sulphonate or the substituted ammonium sulphonate.

The formulas I through VI above may be generalized into a single structural formula as follows:

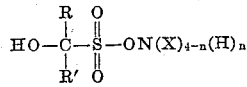

wherein R is selected from the group consisting of aliphatic radicles of at least 10 carbon atoms, cycloaliphatic radicles of at least 6 carbon atoms, and aromatic radicles; R' is selected from the group consisting of hydrogen and methyl, and X is an organic radicle and $n$ is a number from 1 to 4.

Considering the individual radicles in the order named in the preceding paragraph, R may be any aliphatic radicle containing 10 or more carbon atoms, such as, for example, decyl, undecyl, dodecyl, tetradecyl, pentadecyl, hexadecyl, oleyl ($C_{18}H_{35}$), stearyl, palmityl, cetyl, hydroxy stearyl, dichlorostearyl, and the like. The presence or absence of substituent groups such as halogen, hydroxyl, nitro and the like on these aliphatic chains apparently has no influence upon the operability of these agents. The radicle R may also be cycloaliphatic, such as cyclohexyl, methyl cyclohexyl, para-isopropyl cyclohexyl, etc. R may also be aromatic or substituted aromatic such as, for example, phenyl, naphthyl, methyl phenyl, benzyl, chlorophenyl, methoxy phenyl, xylyl, para-tertiary butyl phenyl, etc.

The radicle R' may be hydrogen or methyl. When R' is hydrogen, the compounds useful in accordance with this invention are conveniently produced from ammonium or substituted ammonium bisulphites and aldehydes. R' may also be methyl and in this case the useful compounds are conveniently produced from methyl ketones and the ammonium or substituted ammonium bisulphite.

The radicle X is broadly an organic radicle. For most purposes, organic hydrocarbon radicles are satisfactory, although if desired various substituted organic radicles may be used. Thus, for example, X may be methyl, ethyl, propyl, butyl, hexyl, lauryl, hydroxy stearyl, cyclohexyl, phenyl, benzyl, xylyl, etc. As a matter of fact, the nature of the organic radicle which may be associated with the ammonium radicle is not critically important in the compositions of this invention. The larger the substituent radicle, the more soluble the compound and hence the more efficient operation of the material as an odor-controlling additive.

It becomes convenient at this point to illustrate the practice of this invention with specific examples which have been found to be representative and satisfactory modes of practicing the invention. It is also to be understood that these examples are illustrative and in no way intended to limit the invention to the precise scope thereof.

*Example 1*

The stearyl or octadecyl ammonium bisulphite addition compound of stearaldehyde, $$C_{17}H_{35}CHO \cdot C_{18}H_{37}NH_3HSO_3$$

was produced as follows:

2.6 grams (0.01 mol) of stearylamine were dissolved in 25 ml. of ether and 25 ml. of alcohol. 0.2 ml. (0.01 mol) of water were added and sulphur dioxide was bubbled through the mixture until a clear yellow solution was obtained. 13 ml. of this solution (equal to 0.005 mol of amine) were poured into a solution of 2.7 grams (0.01 mol) of stearaldehyde in 25 ml. of alcohol. A white precipitate was formed which was cooled and filtered to give 2.5 grams (79% of theoretical) of a white solid, M.P. 85 to 105° C. Re-crystallization from absolute alcohol gave 2.0 grams of a white powder, M.P. 103–106° C.

Odor tests were run on samples of an alkyd-type wall paint containing 1% by weight of this addition compound with respect to the weight of the paint. Comparisons with paint samples containing no additive showed that the paint drying odor was less strong, especially after the first 4 hours following application and for a period of several days thereafter.

In the specific tests, a series of compositions were made from an ordinary coating composition containing a soya bean oil modified alkyd resin as the principal binder component. This dries at least in part by oxidative polymerization on reaction with atmospheric oxygen. At concentrations of the additive ranging from 0.01 to 2%, odor tests were run in the manner described below.

The comparison of odor is made by painting out samples on cardboard panels. Each panel is placed in a "test can" and the odor of 2–5 panels of related composition is evaluated by a group of 10 people. The observers are asked to rate the various samples in terms of relative odor, i.e., a range of number ratings of 1 for the least odor to 5 for the highest odor. The "test can" is a 1 gallon round paint container with ⅛" perforations around the outside about 1 inch from the bottom of the can and with a 3 inch hole cut in the lid of the can. This hole is normally covered by a glass Petri dish. The cardboard panel, folded as an inverted V, stands on the bottom of the can. The odor test is made by lifting the glass cover and sniffing.

*Example 2*

Ammonium bisulphite-stearaldehyde, $$C_{17}H_{35}CHO \cdot NH_4HSO_3$$

M.P. 125–160 was made by the same procedure used in Example 1 by replacing stearylamine with an equivalent amount of ammonia. Odor tests in the range of from 0.2% to 1% by weight of this material added to the paint showed a reduction in odor during drying.

*Example 3*

Benzylammonium bisulphite-benzaldehyde, $$C_6H_5CHO \cdot C_6H_5CH_2NH_3HSO_3$$

was made as follows:

10.7 grams (0.1 mol) of benzylamine were dissolved in 25 ml. of ether and 25 ml. of alcohol, and 2.0 ml. of water added. Sulphur dioxide was bubbled through the solution until a clear yellow solution was obtained. This was poured into 21.6 grams (0.2 mol) of benzaldehyde with shaking. A white solid formed which was cooled and filtered to give 21 grams, 71% of theoretical, of a white powder melting at 108–115° C. Paint odor tests with this substance at 0.5 and 1% by weight concentrations indicated odor reduction. There was a faint odor of benzaldehyde.

*Example 4*

Benzylammonium bisulphite-cyclohexanone, $$C_6H_{10}O \cdot C_6H_5CH_2NH_3HSO_3$$

M.P. 120–123° C. was made by the procedure of Example 3. At 1% concentration in paint there was very noticeable odor reduction.

*Example 5*

Benzylammonium bisulphite-methyl undecyl ketone, $C_{11}H_{23}COCH_3 \cdot C_6H_5CH_2NH_3HSO_3$, was obtained by the procedure of Example 3 as a crude product melting at 88–155° C. This was added to the test paint at 1% by weight for odor testing and the results showed an improvement in odor during the drying stages.

*Example 6*

The addition compound of cyclohexanone and ammonium bisulphite $C_6H_{10}O \cdot NH_4HSO_3$ was prepared. 3.5 ml. of concentrated ammonium hydroxide (0.05 mol as $NH_3$) were diluted with 20 ml. of alcohol and sulphur dioxide bubbled through the mixture until a clear yellow solution was obtained. This solution was poured with shaking into 10 ml. (0.1 mol) of cyclohexanone in 10 ml. of alcohol. The white precipitate that formed was cooled and filtered to give 6.5 grams (65% of theoretical) of white crystals that melted with sublimation at 140–155° C.

As in the previous examples, this adduct was added to the test paint at 1% by weight. Observations of the odor during drying showed that the additive reduced the intensity of the odor.

The mechanism by which the alpha substituted sulphonates reduce paint odor is believed to involve the interchange or displacement reaction between the addition compound and volatile odorous aldehydes (aldehyde X) produced in the oxidative polymerization of the film. Thus, we may theoretically represent the Stearaldehyde·$NH_4HSO_3$+aldehyde X⇌aldehyde X·$NH_4HSO_3$+Stearaldehyde Such reaction is believed to prevent the escape of volatile unpleasant smelling aldehydes of low molecular weight. The liberation of the higher molecular weight aldehyde, e.g., stearaldehyde, is not detrimental because it is virtually odorless.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A coating composition which dries at least in part by oxidation containing from about 0.001% to about 5% by weight of an ammonium sulphonate having the following general formula:

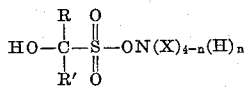

wherein R is selected from the group consisting of aliphatic radicals of at least 10 carbon atoms, cycloaliphatic radicals of at least 6 carbon atoms, and aromatic radicals; R' is selected from the group consisting of hydrogen and methyl, X is an organic hydrocarbon radicle selected from the group consisting of alkyl, cycloalkyl, arylalkyl and aryl radicals, and $n$ is a number from 1 to 4.

2. A coating composition which dries at least in part by oxidation containing from about 0.001% to about 5% by weight of an ammonium salt of an aliphatic alpha hydroxy sulphonic acid containing at least 11 carbon atoms.

3. A coating composition which dries at least in part by oxidation containing from about 0.001% to about 5% by weight of the ammonium salt of alpha hydroxy octadecane sulphonic acid.

4. A coating composition which dries at least in part by oxidation containing from about 0.001% to about 5% by weight of the benzyl ammonium salt of alpha hydroxy cyclohexane ammonium sulphonate.

5. The method of reducing the odor due to oxidation of the binder in a coating composition during drying which comprises adding to said coating composition from about 0.001% to about 5% by weight of an ammonium sulphonate having the following general formula:

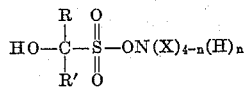

wherein R is selected from the group consisting of aliphatic radicals of at least 10 carbon atoms, cycloaliphatic radicals of at least 6 carbon atoms, and aromatic radicals; R' is selected from the group consisting of hydrogen and methyl, X is an organic hydrocarbon radicle selected from the group consisting of alkyl, cycloalkyl, arylalkyl and aryl radicals, and $n$ is a number from 1 to 4.

References Cited in the file of this patent

UNITED STATES PATENTS

| | | |
|---|---|---|
| 2,103,830 | Shuger | Dec. 28, 1937 |
| 2,185,967 | Priester | Jan. 2, 1940 |
| 2,212,479 | Ogden | Aug. 20, 1940 |
| 2,418,451 | Auer | Apr. 8, 1947 |
| 2,467,192 | Cupery | Apr. 12, 1949 |
| 2,652,341 | Craig | Sept. 15, 1953 |
| 2,660,589 | Squire | Nov. 24, 1953 |

OTHER REFERENCES

Matielle: "Protective and Decorative Coatings" (1941), vol. 1, page 159.